United States Patent
Hirota

(10) Patent No.: US 9,393,939 B2
(45) Date of Patent: Jul. 19, 2016

(54) VEHICLE BRAKING FORCE CONTROL APPARATUS

(71) Applicant: ADVICS CO., LTD., Kariya-shi (JP)

(72) Inventor: Atsuto Hirota, Obu (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/397,148

(22) PCT Filed: Jun. 24, 2013

(86) PCT No.: PCT/JP2013/067199
§ 371 (c)(1),
(2) Date: Oct. 24, 2014

(87) PCT Pub. No.: WO2013/191292
PCT Pub. Date: Dec. 27, 2013

(65) Prior Publication Data
US 2015/0112568 A1    Apr. 23, 2015

(30) Foreign Application Priority Data

Jun. 22, 2012   (JP) ................................. 2012-140784

(51) Int. Cl.
| | | |
|---|---|---|
| *B60T 8/1755* | (2006.01) | |
| *B60T 7/12* | (2006.01) | |
| *B60T 13/66* | (2006.01) | |

(52) U.S. Cl.
CPC .................. *B60T 8/1755* (2013.01); *B60T 7/12* (2013.01); *B60T 8/17551* (2013.01); *B60T 13/662* (2013.01)

(58) Field of Classification Search
CPC ..... B60T 7/12; B60T 8/1755; B60T 8/17551; B60T 13/662
See application file for complete search history.

(56) References Cited

U.S. PATENT DOCUMENTS

| | | | | |
|---|---|---|---|---|
| 5,134,352 A | * | 7/1992 | Matsumoto et al. | 318/587 |
| 5,857,754 A | * | 1/1999 | Fukami et al. | 303/146 |

(Continued)

FOREIGN PATENT DOCUMENTS

| | | |
|---|---|---|
| JP | 8-310364 A | 11/1996 |
| JP | 10-250548 A | 9/1998 |

(Continued)

OTHER PUBLICATIONS

International Search Report (PCT/ISA/210) mailed on Jul. 23, 2013, by the Japanese Patent Office as the International Searching Authority for International Application No. PCT/JP2013/067199.

(Continued)

*Primary Examiner* — Jerrah Edwards
*Assistant Examiner* — Tamara Weber
(74) *Attorney, Agent, or Firm* — Buchanan Ingersoll & Rooney PC

(57) ABSTRACT

It is determined whether or not there is a "wheel to be subject to the vehicle stability control, in which a braking force is decreased with respect to a braking force corresponding to the pressing force of the brake pad due to fade or the like" (reduced braking force wheel) during vehicle stability control. When there is a reduced braking force wheel, a "wheel with a highest order of priority determined in advance for wheels for which a braking force needs to be generated in order to enhance the travel stability in the vehicle stability control" (first braking force allocated wheel) is identified among wheels excluding the reduced braking force wheel, and the pressing force of the brake pad of the first braking force allocated wheel is increased based on a lack of the braking force in the reduced braking force wheel.

6 Claims, 6 Drawing Sheets

(56) References Cited

U.S. PATENT DOCUMENTS

| | | | |
|---|---|---|---|
| 6,132,014 A | 10/2000 | Kiso et al. | |
| 6,183,052 B1* | 2/2001 | Harada et al. | 303/147 |
| 6,219,610 B1* | 4/2001 | Araki | 701/72 |
| 6,322,167 B1* | 11/2001 | Pruhs et al. | 303/146 |
| 6,416,140 B1* | 7/2002 | Yamamoto et al. | 303/122 |
| 6,547,343 B1* | 4/2003 | Hac | 303/146 |
| 2005/0251316 A1* | 11/2005 | Kato et al. | 701/70 |
| 2008/0007115 A1* | 1/2008 | Mizutani | 303/113.2 |
| 2009/0187302 A1* | 7/2009 | Takenaka et al. | 701/29 |
| 2009/0319114 A1* | 12/2009 | Takenaka et al. | 701/29 |
| 2010/0332098 A1* | 12/2010 | Kato | 701/72 |

FOREIGN PATENT DOCUMENTS

| | | |
|---|---|---|
| JP | 10-273025 A | 10/1998 |
| JP | 11-34831 A | 2/1999 |
| JP | 3257354 B2 | 2/2002 |
| JP | 2003-104186 A | 4/2003 |
| JP | 2007-237899 A | 9/2007 |
| JP | 2008-179272 A | 8/2008 |
| JP | 2009-101918 A | 5/2009 |
| JP | 2011-189902 A | 9/2011 |

OTHER PUBLICATIONS

Written Opinion (PCT/ISA/237) mailed on Jul. 23, 2013, by the Japanese Patent Office as the International Searching Authority for International Application No. PCT/JP2013/067199.

* cited by examiner

VEHICLE BRAKING FORCE CONTROL APPARATUS

TECHNICAL FIELD

The present invention relates to a vehicle braking force control apparatus.

BACKGROUND ART

Hitherto, there has been known a phenomenon in which a braking force (braking torque) generated in a vehicle decreases relative to a braking force (braking toque) corresponding to a pressing force of a friction braking member (or a wheel cylinder hydraulic pressure). This phenomenon may be caused by a phenomenon in which a friction coefficient of a friction braking member (brake pad) decreases due to an excess increase in temperature of the friction braking member (so-called fade), a phenomenon in which ice and snow enter between the friction braking member (brake pad) and a disk member (brake disk) to decrease the friction coefficient therebetween (so-called snow fade), or the like. A wheel in which this phenomenon is occurring is hereinafter referred to as "reduced braking force wheel".

When there is a reduced braking force wheel, required vehicle states (a deceleration state, a turning state, etc.) are difficult to be realized. In particular, in the case where a wheel in which a braking force is generated due to vehicle stability control such as oversteer suppression control or understeer suppression control during the vehicle stability control serves as a reduced braking force wheel, the control is difficult to be achieved because a required turning moment or the like is difficult to be generated.

In order to solve the above-mentioned problem, JP 2009-101918 A describes that, in the case where there is a reduced braking force wheel caused by snow fade, the snow fade of the reduced braking force wheel can be cancelled by performing snow fade cancellation control such as periodically varying a wheel cylinder hydraulic pressure for the reduced braking force wheel greatly or temporarily setting the wheel cylinder hydraulic pressure for the reduced braking force wheel to be an excess high pressure.

Further, JP 2007-237899 A describes that, in the case where there is a reduced braking force wheel caused by fade during anti-lock braking control, an increase in braking distance is suppressed by performing control such as increasing a wheel cylinder hydraulic pressure for the reduced braking force wheel, decreasing a pressure-reducing speed of the wheel cylinder hydraulic pressure, or increasing a pressure-intensifying speed of the wheel cylinder hydraulic pressure.

SUMMARY OF INVENTION

By the way, the apparatus described in the above-mentioned two literatures have the following in common. Specifically, in the case where there is a reduced braking force wheel, the above-mentioned problem is solved by adjusting the wheel cylinder hydraulic pressure (pressing force of the friction braking member) of the reduced braking force wheel itself.

However, in the case where the "degree of decrease in braking force" in the reduced braking force wheel (the degree of decrease in the braking force generated in a vehicle with respect to the braking force corresponding to the pressing force of the friction braking member) is large, even when the wheel cylinder hydraulic pressure (pressing force of the friction braking member) for the reduced braking force wheel is increased, such a situation occurs that a required braking force (braking torque) is not sufficiently generated in the reduced braking force wheel. Consequently, the state in which the required vehicle state cannot be still realized may continue.

It is an object of the present invention to provide a vehicle braking force control apparatus that can realize a required vehicle state even in the case where the "degree of decrease in braking force" in a reduced braking force wheel is large.

According to one embodiment of the present invention, there is provided a vehicle braking force control apparatus, including: determination means for determining whether or not there is a wheel (=reduced braking force wheel) in which a generated braking force (friction) is decreased with respect to "a braking force corresponding to a pressing force of a friction braking member (on a rotation member that rotates integrally with a wheel)"; and braking force compensation means for increasing, based on the determination that the reduced braking force wheel is present, the pressing force of the friction braking member of a wheel other than the reduced braking force wheel based on a lack of the braking force in the reduced braking force wheel.

According to the above-mentioned configuration, in the case where the reduced braking force wheel is present, the pressing force of the friction braking member of a wheel other than the reduced braking force wheel is increased (without adjusting the pressing force of the friction braking member (wheel cylinder hydraulic pressure) of the reduced braking force wheel itself). Thus, even in the case where the "degree of decrease in braking force" in the reduced braking force wheel is large, the lack of a braking force can be compensated for reliably by the increase in braking force of the wheel other than the reduced braking force wheel, and the required vehicle state can be realized.

When the above-mentioned braking force control apparatus according to one embodiment of the present invention includes control means for performing a vehicle stability control, it is preferred that the determination means be configured to determine whether or not there is a reduced braking force wheel in which "a braking force is generated due to the vehicle stability control and the generated braking force is decreased with respect to a braking force corresponding to the pressing force of the friction braking member" during the vehicle stability control, and that the braking force compensation means be configured to identify, based on the determination that the reduced braking force wheel is present, among a plurality of wheels excluding the reduced braking force wheel, a "wheel (first braking force allocated wheel) with a highest order of priority determined in advance for wheels for which a braking force needs to be generated in order to enhance the travel stability" in the vehicle stability control, and to increase the pressing force of the friction braking member of the first braking force allocated wheel based on a lack of the braking force in the reduced braking force wheel.

According to the above-mentioned configuration, even in the case where the "degree of decrease in braking force" in the reduced braking force wheel is large during vehicle stability control such as oversteer suppression control or understeer suppression control, a required turning moment is generated reliably due to the increase in braking force of the first braking force allocated wheel, and the vehicle stability control can be achieved.

Note that, in the case where the oversteer suppression control for suppressing oversteer of the vehicle is adopted as the vehicle stability control, a front wheel on an outer side of turning and a rear wheel on the outer side of turning can be set in descending order of the priority. Further, in the case where the understeer suppression control for suppressing understeer of the vehicle is adopted as the vehicle stability control, a rear wheel on an inner side of turning, a front wheel on the inner side of turning, a rear wheel on an outer side of turning, and a front wheel on the outer side of turning can be set in descending order of the priority.

DESCRIPTION OF EMBODIMENT

Now, a vehicle braking force control apparatus according to an embodiment of the present invention is described referring to the accompanying drawings.

(First Embodiment)

Figure 1:
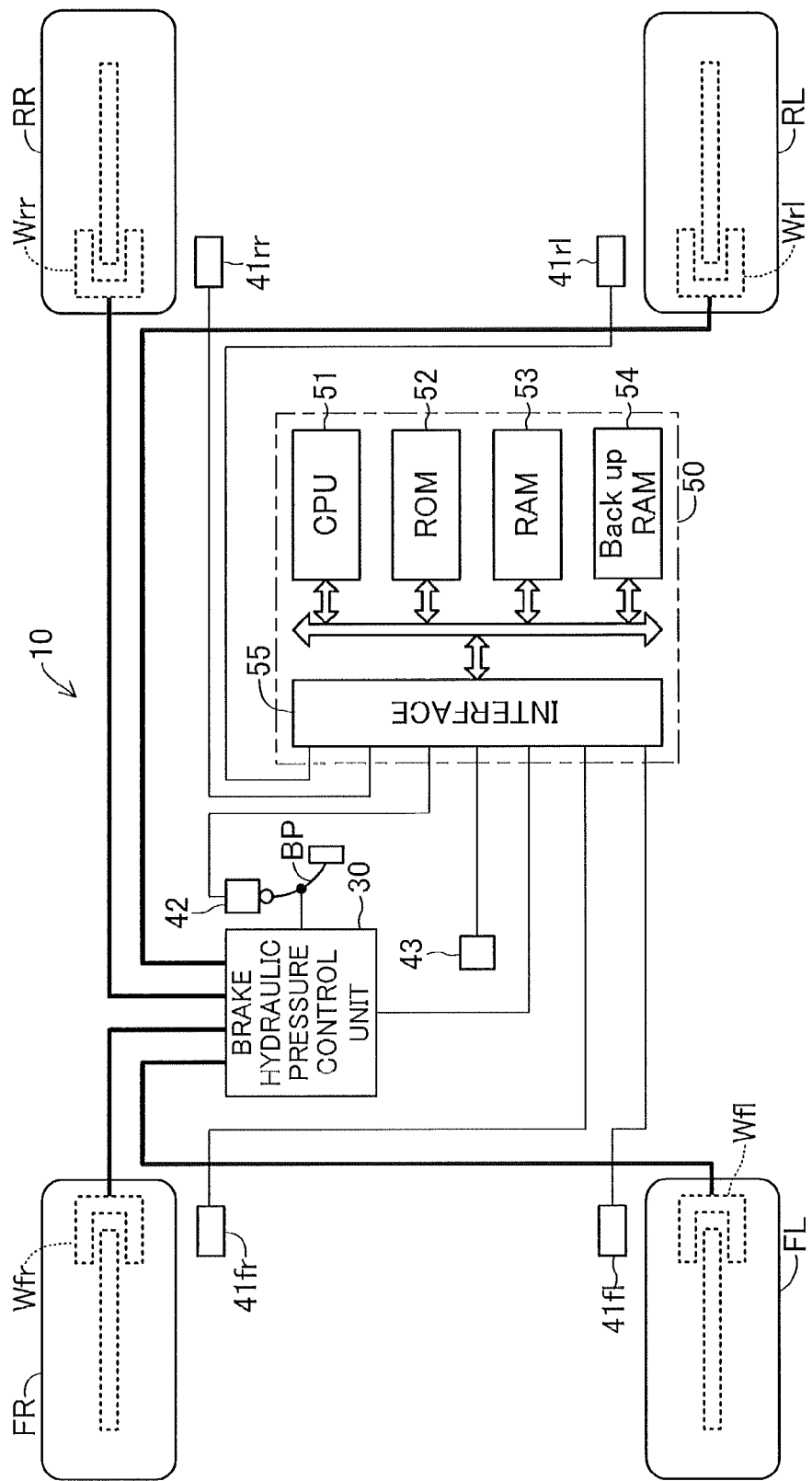
FIG. 1 is a schematic structural view of a vehicle on which a vehicle braking force control apparatus according to a first embodiment of the present invention is mounted.

FIG. 1 illustrates a schematic structure of a vehicle on which a vehicle brake device 10 including the vehicle braking force control apparatus according to the embodiment of the present invention is mounted. The symbol "**" affixed to the end of each of variables is hereinafter a comprehensive notation of the symbols "fr", "fl", and the like to be affixed to the end of each of the variables so as to indicate which of wheels FR, FL, RR, and RL the variable is associated with.

Figure 2:
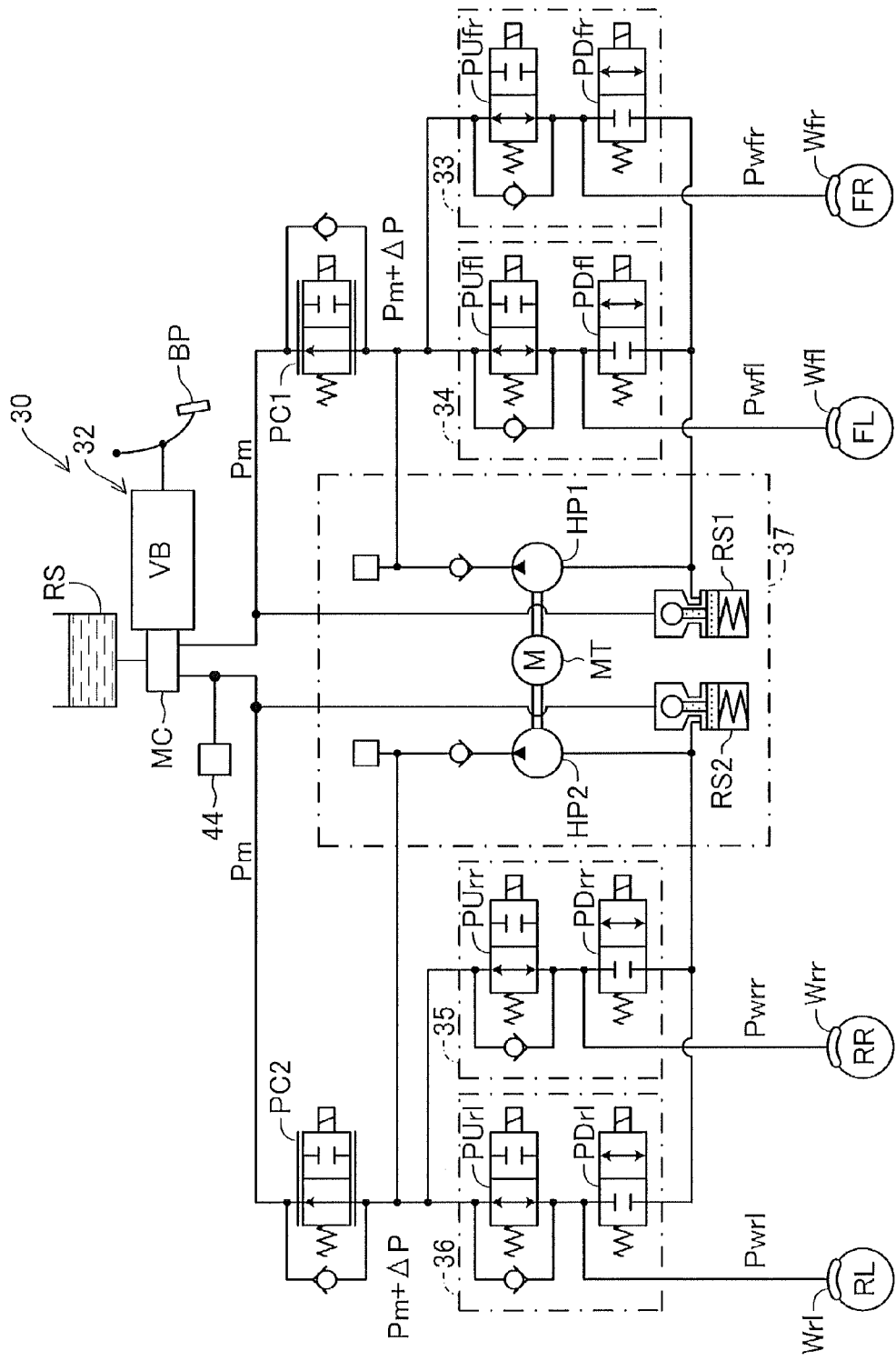
FIG. 2 is a schematic structural view of a brake hydraulic pressure control unit illustrated in FIG. 1.

The vehicle brake device 10 includes a brake hydraulic pressure control unit 30 for generating a friction braking force (friction braking torque) in a wheel  due to a wheel cylinder hydraulic pressure. As illustrated in FIG. 2, the brake hydraulic pressure control unit 30 includes a brake hydraulic pressure generating section 32 for generating a hydraulic pressure in accordance with a stroke of (or a pedaling force on) a brake pedal BP, brake hydraulic pressure adjusting sections 33 to 36, each for adjusting the wheel cylinder hydraulic pressure applied to a wheel cylinder W provided to the wheel , and a reflux brake-fluid supplying section 37. In the wheel, when a friction braking member (brake pad) is pressed against a "brake disk which rotates integrally with the wheel" with a pressing force corresponding to the wheel cylinder hydraulic pressure of the W**, friction braking torque corresponding to the wheel cylinder hydraulic pressure is applied to the brake disk.

The brake hydraulic pressure generating section 32 includes a vacuum booster VB that operates in response to an operation of the brake pedal BP and a master cylinder MC connected to the vacuum booster VB. The vacuum booster VB uses an air pressure (negative pressure) in an intake pipe of an engine (not shown) to assist an operating force on the brake pedal BP at a predetermined rate so as to transmit the assisted operating force to the master cylinder MC.

The master cylinder MC includes two output ports. The master cylinder MC receives the supply of a brake fluid from a reservoir RS to generate and output a hydraulic pressure (master cylinder hydraulic pressure Pm) in accordance with the assisted operating force from each of the two output ports. The configurations and actuation of the master cylinder MC and the vacuum booster VB are well-known, and therefore the detailed description thereof is herein omitted.

A normally-open linear solenoid valve PC1 is provided between one of the ports of the master cylinder MC and a portion located upstream of the brake hydraulic pressure adjusting sections 33 and 34, whereas a normally-open linear solenoid valve PC2 is provided between another of the ports of the master cylinder MC and a portion located upstream of the brake hydraulic pressure adjusting sections 35 and 36. The details of the linear solenoid valves PC1 and PC2 are described below.

Each of the brake hydraulic pressure adjusting sections 33 to 36 includes a pressure-intensifying valve PU which is a two-port two-position switchover normally-open solenoid on-off valve and a pressure-reducing valve PD which is a two-port two-position switchover normally-closed solenoid on-off valve. The pressure-intensifying valve PU can bring the portion upstream of a corresponding one of the brake hydraulic pressure adjusting sections 33 to 36 and the wheel cylinder W into communication with each other and interrupt the communication therebetween. The pressure-reducing valve PD can bring the wheel cylinder W and a corresponding one of reservoirs RS1 and RS2 into communication with each other and interrupt the communication therebetween. As a result, by controlling the pressure-intensifying valve PU and the pressure-reducing valve PD, the hydraulic pressure of the wheel cylinder W (wheel cylinder hydraulic pressure Pw) can be intensified, kept, and reduced.

The reflux brake-fluid supplying section 37 includes a DC motor MT and two hydraulic pressure pumps (gear pumps) HP1 and HP2 that are simultaneously driven by the DC motor MT. The hydraulic pressure pumps HP1 and HP2 respectively pump up the brake fluids in the reservoirs RS1 and RS2, which are refluxed from the pressure-reducing valve PD**, and supply the pumped brake fluids to the portion located upstream of the brake hydraulic pressure adjusting sections 33 and 34 and the portion located upstream of the brake hydraulic pressure adjusting sections 35 and 36, respectively.

Next, the normally-open linear solenoid valves PC1 and PC2 are described. A force in an opening direction based on a biasing force by a coil spring (not shown) constantly acts on a valve body of each of the normally-open linear solenoid valves PC1 and PC2. In addition, another force in the opening direction and a force in a closing direction also act on the valve body of each of the normally-open linear solenoid valves PC1 and PC2. Specifically, the another force in the opening direction is based on a pressure difference (linear valve pressure difference $\Delta P$) obtained by subtracting the master cylinder hydraulic pressure Pm from a pressure at the portion upstream of the corresponding one of the set of the brake hydraulic pressure adjusting sections 33 and 34 and the set of the brake hydraulic pressure adjusting sections 35 and 36, whereas the force in the closing direction is based on an attraction force that increases in proportion to a current (command current Id) supplied to each of the normally-open linear solenoid valves PC1 and PC2.

Figure 3:
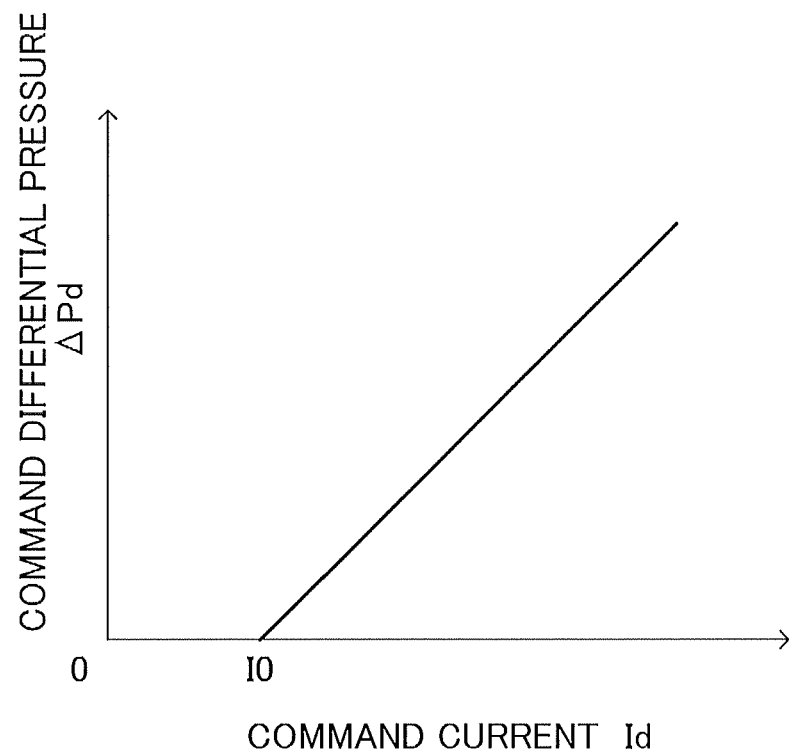
FIG. 3 is a graph showing a relationship between a command current and a command differential pressure regarding a normally-open linear solenoid valve illustrated in FIG. 2.

As a result, as shown in FIG. 3, a command pressure difference $\Delta Pd$ that is a command value for the linear valve pressure difference $\Delta P$ is determined so as to increase in proportion to the command current Id. Here, a current value I0 corresponds to the biasing force of the coil spring. Each of the normally-open linear solenoid valves PC1 and PC2 is closed when the command pressure difference ΔPd is larger than the linear valve pressure difference ΔP, and is opened when the command pressure difference ΔPd is smaller than the linear valve pressure difference ΔP. As a result, when the hydraulic pressure pumps HP1 and HP2 are driven, the brake fluid in the portion located upstream of the corresponding one of the set of the brake hydraulic pressure adjusting sections 33 and 34 and the set of the brake hydraulic pressure adjusting sections 35 and 36 flows toward a corresponding one of the ports of the master cylinder MC through a corresponding one of the normally-open linear solenoid valves PC1 and PC2. In this manner, the linear valve pressure difference ΔP can be adjusted so as to become equal to the command pressure difference ΔPd. The brake fluid flowing toward the corresponding port of the master cylinder MC is refluxed to a corresponding one of the reservoirs RS1 and RS2.

In other words, when the motor MT (correspondingly, the hydraulic pressure pumps HP1 and HP2) is driven, the linear valve pressure difference ΔP can be controlled in accordance with the command current Id of each of the normally-open linear solenoid valves PC1 and PC2. The pressure of the portion upstream of each of the set of the brake hydraulic pressure adjusting sections 33 and 34 and the set of the brake hydraulic pressure adjusting sections 35 and 36 has a value (Pm+PΔ) obtained by adding the linear valve pressure difference ΔP to the master cylinder hydraulic pressure Pm. After the driving of the hydraulic pressure pumps HP1 and HP2 is stopped in a state in which the linear valve pressure difference ΔP is adjusted to a value larger than zero, the linear valve pressure difference ΔP can still be continuously adjusted only in a decreasing direction by adjusting the command current Id in the decreasing direction.

When the normally-open linear solenoid valves PC1 and PC2 are brought into a de-energized state (specifically, when the command current Id is set to "0"), the normally-open linear solenoid valves PC1 and PC2 are configured to maintain an open state by the biasing forces of the coil springs. At this time, the linear valve pressure difference ΔP becomes "0", and hence the pressure of the portion upstream of each of the set of the brake hydraulic pressure adjusting sections 33 and 34 and the set of the brake hydraulic pressure adjusting sections 35 and 36 becomes equal to the master cylinder pressure Pm.

With the configuration described above, the brake hydraulic pressure control unit 30 includes a two-system hydraulic pressure circuit, that is, one system relating to right and left front wheels FR and FL and another system relating to right and left rear wheels RR and RL. In the brake hydraulic pressure control unit 30, when all the solenoid valves are in the de-energized state, the wheel cylinder hydraulic pressure Pw** is adjusted to a value equal to the master cylinder hydraulic pressure Pm.

On the other hand, by driving the motor MT (correspondingly, by driving the hydraulic pressure pumps HP1 and HP2) and controlling the normally-open linear solenoid valves PC1 and PC2 in the above-mentioned state, the wheel cylinder hydraulic pressure Pw is adjusted to the hydraulic pressure (Pm+ΔP). Further, by controlling the pressure-intensifying valve PU and the pressure-reducing valve PD, the wheel cylinder hydraulic pressure Pw can be independently adjusted for each wheel. Specifically, a braking force to be applied to the wheel** can be adjusted independently for each wheel, regardless of the operation of the brake pedal BP that is performed by the driver.

Returning to FIG. 1, the vehicle brake device 10 includes wheel-speed sensors 41, a brake switch 42, a yaw rate sensor 43, and a master cylinder hydraulic pressure sensor 44 (see FIG. 2). Each of the wheel-speed sensors 41 detects a rotation speed of a corresponding one of wheels. The brake switch 42 selectively outputs a signal in accordance with whether or not the brake pedal BP is operated. The yaw rate sensor 43 detects a yaw rate of a vehicle. The master cylinder hydraulic pressure sensor 44 detects the master cylinder hydraulic pressure Pm.

The vehicle brake device 10 further includes an electronic control unit 50. The electronic control unit 50 is a microcomputer including a CPU 51, a ROM 52, a RAM 53, a back-up RAM 54, an interface 55, and the like.

The interface 55 is connected to the sensors 41 to 44 and other various sensors so that signals from the sensors 41 to 44 and the like are supplied to the CPU 51 and driving signals are transmitted to the solenoid valves (the normally-open linear solenoid valves PC1 and PC2, the pressure-intensifying valve PU, and the pressure-reducing valve PD) of the brake hydraulic pressure control unit 30 and the motor MT in accordance with an instruction of the CPU 51.

(Vehicle Stability Control)

Figure 4:
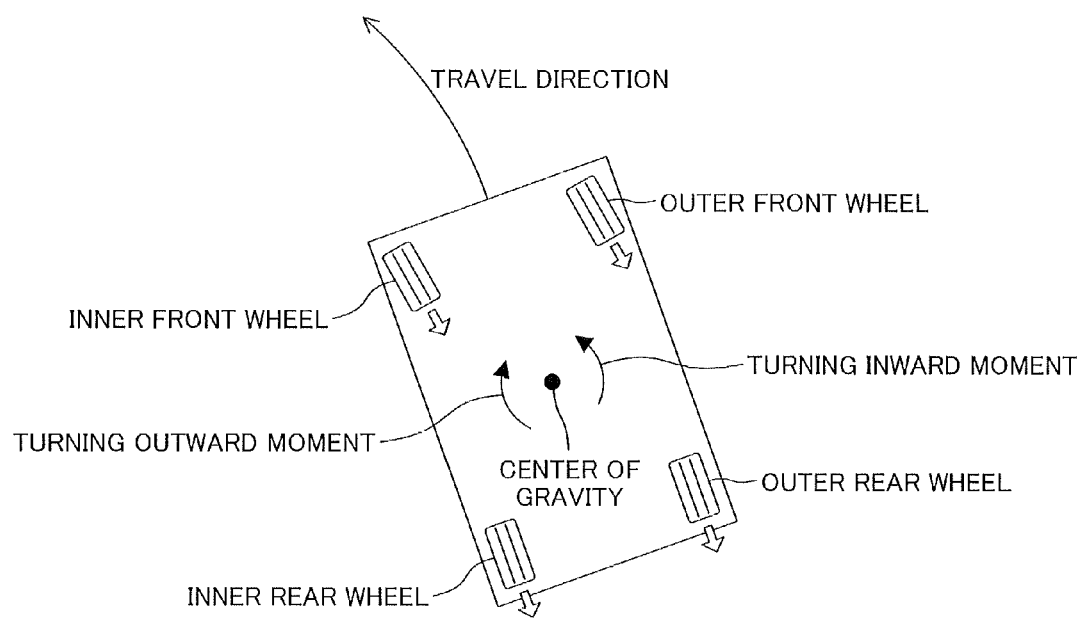
FIG. 4 is a view illustrating a relationship between a braking force which acts on each wheel of a vehicle and a turning moment caused by the braking force.

The brake device 10 (specifically, CPU 51) performs well-known vehicle stability control for enhancing travel stability of a vehicle. The vehicle stability control is briefly described with reference to FIG. 4. For convenience of the description, a front wheel on an outer side of turning, a rear wheel on the outer side of turning, a front wheel on an inner side of turning, and a rear wheel on the inner side of turning are hereinafter respectively referred to as "outer front wheel", "outer rear wheel", "inner front wheel", and "inner rear wheel".

In this example, the vehicle stability control specifically refers to oversteer suppression control and understeer suppression control. The oversteer suppression control involves actively generating a turning outward moment (see FIG. 4) around the center of gravity of a vehicle by adjusting the wheel cylinder hydraulic pressure of each wheel (correspondingly, the pressing force of the friction braking member) without depending on a braking operation of a driver (operation of the brake pedal BP) (irrespective of whether the braking operation is being performed or not) in the case where it is determined that the vehicle is liable to oversteer based on the turning state of the vehicle. In the oversteer suppression control, specifically, a turning outward moment is generated mainly when a braking force is applied to the outer front wheel and the outer rear wheel.

The understeer suppression control involves actively generating a turning inward moment (see FIG. 4) around the center of gravity of a vehicle by adjusting the wheel cylinder hydraulic pressure of each wheel (correspondingly, the pressing force of the friction braking member) without depending on the braking operation of a driver (operation of the brake pedal BP) (irrespective of whether the braking operation is being performed or not) in the case where it is determined that the vehicle is liable to understeer based on the turning state of the vehicle. In the understeer suppression control, specifically, the turning inward moment is generated mainly when the braking force is applied to the inner rear wheel and the inner front wheel.

During the vehicle stability control, a target braking force (target braking torque, target wheel cylinder hydraulic pressure, etc.) for each wheel is set in accordance with the turning state of the vehicle, and an actual braking force (actual braking torque, actual wheel cylinder hydraulic pressure, etc.) of each wheel is controlled so as to be matched with the corresponding target braking force. In the vehicle stability control, a wheel to be applied with a braking force, the magnitude of a braking force to be applied, and the like are the same as those in the well-known vehicle stability control, and hence the detailed descriptions thereof are omitted herein. The "wheel to be applied with a braking force" is hereinafter referred to as "wheel to be controlled".

(Control of Compensating for Lack of Braking Force of Reduced Braking Force Wheel)

By the way, in the brake device 10, the phenomenon (so-called fade) in which the friction coefficient of the friction braking member (brake pad) decreases due to an excess increase in temperature of the friction braking member or the phenomenon (so-called snow fade) in which ice and snow enter between the friction braking member (brake pad) and the disk member (brake disk) to decrease the friction coefficient therebetween may occur inevitably. When those phenomena occur, the braking force (braking torque) generated in the vehicle decreases excessively with respect to the "(intended) braking force (braking torque) corresponding to the pressing force (or wheel cylinder hydraulic pressure) of the friction braking member". The wheel in which the braking force has been decreased as described above is hereinafter referred to as "reduced braking force wheel".

In the case where a wheel to be controlled is a reduced braking force wheel during the vehicle stability control, the vehicle stability control is difficult to be achieved due to the difficulty in generation of a required turning moment or the like. Specifically, for example, in the case where an outer front wheel is a reduced braking force wheel while the braking force is applied only to the outer front wheel during the oversteer suppression control, a turning outward moment does not sufficiently act on the vehicle, and consequently, such a situation that the oversteer tendency is not sufficiently cancelled may occur.

In this case, it is also considered to increase the wheel cylinder hydraulic pressure (pressing force of the friction braking member) of the reduced braking force wheel. However, in the case where the "degree of decrease in braking force" (in other words, the degree of fade) in the reduced braking force wheel is large, even when the wheel cylinder hydraulic pressure (pressing force of the friction braking member) of the reduced braking force wheel is increased, a required braking force (braking torque) may not be generated in the reduced braking force wheel, and consequently, such a situation that a required vehicle state is not realized may still continue.

Then, in the case where it is determined that a wheel to be controlled is a reduced braking force wheel during the vehicle stability control, the brake device 10 generates a braking force in "another wheel for which a braking force needs to be generated in order to achieve the vehicle stability control" excluding the reduced braking force wheel (increases the wheel cylinder hydraulic pressure of another wheel) without increasing the wheel cylinder hydraulic pressure of the reduced braking force wheel. Thus, the lack of the braking force of the reduced braking force wheel is compensated for. Note that, this control is performed without depending on the braking operation (operation of the brake pedal BP) of a driver (irrespective of whether the braking operation is being performed or not).

Figure 5:
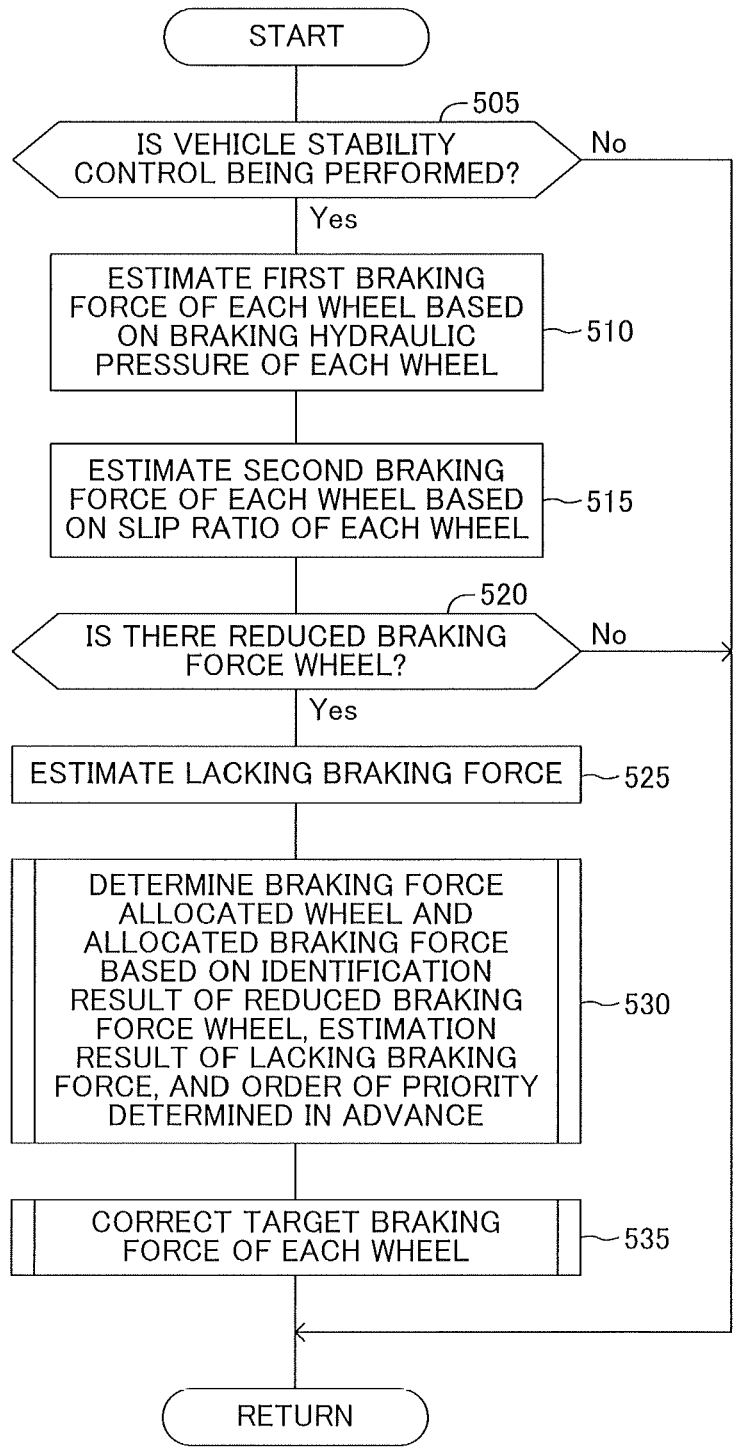
FIG. 5 is a flow chart illustrating a routine for performing control of compensating for the lack of a braking force when there is a reduced braking force wheel, the routine being executed by a CPU illustrated in FIG. 1.

This control is hereinafter described with reference to FIG. 5. FIG. 5 illustrates a flow of processing of a program stored in the ROM 52 for allowing the CPU 51 to perform this control. This processing is repeatedly performed every time a predetermined timing (for example, 6 milliseconds) elapses.

First, in Step 505, it is determined whether or not the vehicle stability control is being performed. Specifically, it is determined whether the oversteer (OS) suppression control or the understeer (US) suppression control is being performed. In the case where the vehicle stability control is not being performed, the processing of this program is ended. The case where the vehicle stability control is being performed is hereinafter described.

In Step 510, a first braking force of each wheel is estimated based on the wheel cylinder hydraulic pressure of each wheel. In Step 515, a second braking force of each wheel is estimated based on the slip ratio (and vertical load) of each wheel. As described later, the first and second braking forces are used for determining the presence/absence of a reduced braking force wheel and the estimation of a lacking braking force in the reduced braking force wheel.

The first braking force of each wheel is determined specifically by applying the current wheel cylinder hydraulic pressure of a corresponding wheel to a map (table) showing a relationship of "wheel cylinder hydraulic pressure—braking force" stored in the ROM 52. The map is created based on the results of an experiment or the like conducted for a wheel in which a friction coefficient between the brake pad and the brake disk is normal (that is, a wheel which is not a reduced braking force wheel). The current wheel cylinder hydraulic pressure of a wheel can be obtained, for example, based on the detection results of a wheel cylinder hydraulic pressure sensor (not shown).

The second braking force of each wheel is specifically obtained by multiplying a friction coefficient obtained by applying the "current slip ratio of a corresponding wheel" to the map (table) showing a relationship of "slip ratio—friction coefficient" stored in the ROM 52 by the vertical load of the corresponding wheel. The current slip ratio of a wheel can be calculated based on an estimated car body speed obtained from the detection results of the vehicle speed sensor **41\*\*** and the current wheel speed of the wheel. The vertical load of a wheel may be a fixed value (static value) obtained only from various factors of a vehicle or a value (dynamic value) obtained by adding or subtracting an inertia force based on acceleration of the vehicle with respect to the predetermined value.

In Step 520, it is determined whether or not there is a reduced braking force wheel among wheels to be controlled (that is, one or a plurality of wheels in which the wheel cylinder hydraulic pressure has been increased due to the execution of the vehicle stability control). Specifically, for example, it is determined whether or not a value obtained by subtracting the second braking force from the first braking force is larger than a predetermined value (positive value) regarding each wheel to be controlled. When there is a wheel in which a value obtained by subtracting the second braking force from the first braking force is larger than the predetermined value (positive value), it is determined that the wheel (one wheel) is a reduced braking force wheel. Note that, this determination may be performed, for example, based on the detection results of a sensor for measuring the temperature of a brake pad and the like.

In Step 520, in the case where there is no reduced braking force wheel, the processing of this program is ended. The case where there is a reduced braking force wheel among the wheels to be controlled is described. In this case, in Step 525, a braking force which is lacking (lacking braking force) is estimated for the reduced braking force wheel. The lacking braking force is obtained, for example, by subtracting the second braking force from the first braking force. Note that, the lacking braking force may be estimated, for example, based on the detection results of a sensor for measuring the temperature of the brake pad and the like.

In Step 530, a wheel for which a braking force needs to be applied (that is, a wheel in which the wheel cylinder hydraulic pressure needs to be increased) (one wheel, hereinafter referred to as "first braking force allocated wheel") is determined from "other wheels for which a braking force needs to be generated in order to achieve the vehicle stability control" excluding the wheel to be controlled. Specifically, as shown in Table 1, the order of priority is determined in advance regarding the "wheel for which a braking force needs to be generated" on the basis of the control which is being performed.

TABLE 1

| | Order of priority | | | |
|---|---|---|---|---|
| | 1 | 2 | 3 | 4 |
| OS suppression control | Outer front wheel | Outer rear wheel | — | — |
| US suppression control | Inner rear wheel | Inner front wheel | Outer rear wheel | Outer front wheel |

As shown in Table 1, regarding the OS suppression control, the outer front wheel and the outer rear wheel are set in descending order of priority. On the other hand, regarding the US suppression control, the inner rear wheel, the inner front wheel, the outer rear wheel, and the outer front wheel are set in descending order of priority.

A wheel with the highest order of priority other than the reduced braking force wheel is determined to be the first braking force allocated wheel. For example, in the case where the outer front wheel is determined to be the reduced braking force wheel when only the outer front wheel or the outer front wheel and the outer rear wheel are wheels to be controlled during the OS suppression control, the outer rear wheel is determined to be the first braking force allocated wheel. In the case where the outer rear wheel is determined to be the reduced braking force wheel when the outer front wheel and the outer rear wheel are wheels to be controlled, the outer front wheel is determined to be the first braking force allocated wheel.

For example, in the case where the inner rear wheel is determined to be the reduced braking force wheel when only the inner rear wheel or the inner rear wheel and the inner front wheel are wheels to be controlled in the US suppression control, the inner front wheel is determined to be the first braking force allocated wheel. In the case where it is determined that the inner front wheel is the reduced braking force wheel when the inner rear wheel and the inner front wheel are wheels to be controlled, the inner rear wheel is determined to be the first braking force allocated wheel.

In Step 530, a braking force (allocated braking force) to be allocated to the first braking force allocated wheel is also determined. The allocated braking force is determined, for example, by multiplying the lacking braking force estimated in Step 525 by a coefficient K. The coefficient K may be smaller or larger than 1, and may be constant or variable.

The coefficient K may be determined based on various factors (for example, tread) of a vehicle so that, for example in the case where an allocated braking force is applied to the first braking force allocated wheel, a turning moment of the same magnitude and direction as those of the "turning moment generated due to the application of a braking force of the same magnitude as that of the lacking braking force to the reduced braking force wheel" is obtained.

When the first braking force allocated wheel and the allocated braking force are determined, the "determined allocated braking force" is added to the target braking force of the first braking force allocated wheel in the vehicle stability control to correct the target braking force of the first braking force allocated wheel in Step 535. Note that, the target braking force of the wheels other than the first braking force allocated wheel is not corrected.

In the case where the target braking force of the first braking force allocated wheel exceeds a predetermined upper limit value due to the correction of the target braking force of the first braking force allocated wheel (in other words, in the case where the target value of the wheel cylinder hydraulic pressure (pressing force of the brake pad) exceeds a predetermined upper limit value), the target braking force of the first braking force allocated wheel may be set to a value equal to the predetermined upper limit value, and the "amount exceeding the upper limit value" may be allocated to the second braking force allocated wheel.

A wheel with the second highest order of priority other than the reduced braking force wheel is determined to be the second braking force allocated wheel. Specifically, for example, in the case where the inner rear wheel is the reduced braking force wheel and the inner front wheel is determined to be the first braking force allocated wheel when only the inner rear wheel or the inner rear wheel and the inner front wheel are wheels to be controlled during the US suppression control, the outer rear wheel is determined to be the second braking force allocated wheel.

Figure 6:
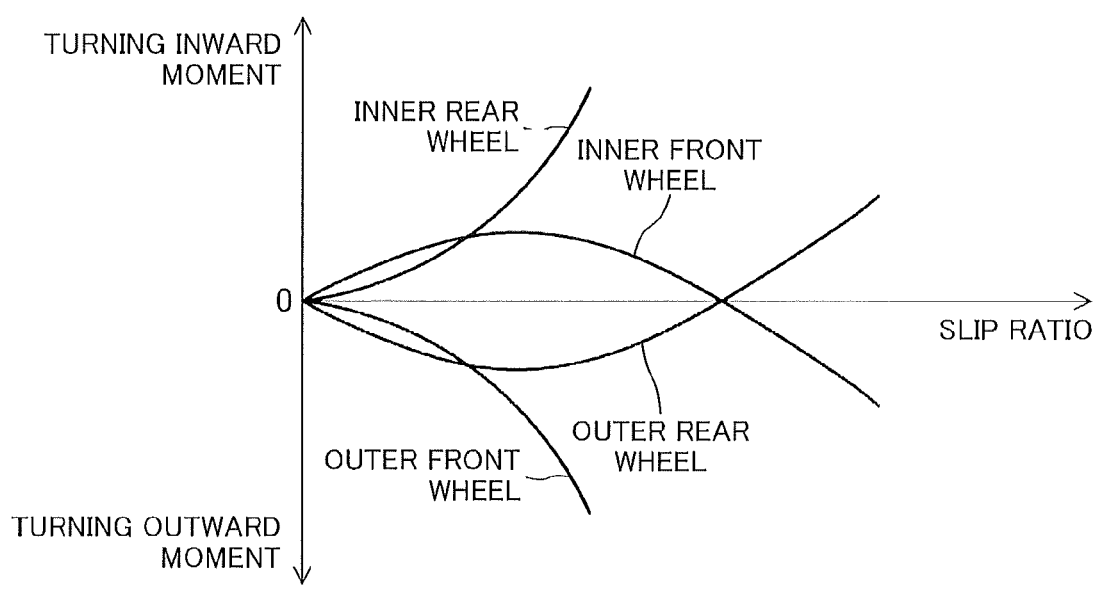
FIG. 6 is a graph showing a relationship between a braking force which acts on each wheel, and magnitude and direction of a turning moment caused by the braking force.

The above-mentioned "predetermined upper limit value" may be constant or variable. The above-mentioned "predetermined upper limit value" may be determined based on the slip ratio of the first braking force allocated wheel based on the map shown in FIG. 6. As is understood from FIG. 6, when the slip ratio of the outer rear wheel is increased by gradually increasing the wheel cylinder hydraulic pressure (pressing force of the brake pad) of the outer rear wheel, the turning outward moment initially increases from 0, then decreases to 0, and thereafter becomes a negative value. This means that when the braking force (braking torque, wheel cylinder hydraulic pressure) to be applied to the outer rear wheel serving as the first braking force allocated wheel exceeds a certain value during the OS suppression control, the braking force does not contribute to the generation of a turning outward moment any more. Considering this, in the case where the outer rear wheel is determined to be the first braking force allocated wheel during the OS suppression control, the braking force (braking torque, wheel cylinder hydraulic pressure) of the outer rear wheel when the slip ratio of the outer rear wheel reaches a "value corresponding to the turning outward moment=0" can be used as the above-mentioned "predetermined upper limit value".

Similarly, when the slip ratio of the inner front wheel is increased by gradually increasing the wheel cylinder hydraulic pressure (pressing force of the brake pad) of the inner front wheel, the turning inward moment initially increases from 0, then decreases to 0, and thereafter becomes a negative value. This means that when the braking force (braking torque, wheel cylinder hydraulic pressure) to be applied to the inner front wheel serving as the first braking force allocated wheel exceeds a certain value during the US suppression control, the braking force does not contribute to the generation of a turning inward moment any more. Considering this, in the case where the inner front wheel is determined to be the first braking force allocated wheel during the US suppression control, the braking force (braking torque, wheel cylinder hydraulic pressure) of the inner front wheel when the slip ratio of the inner front wheel reaches a "value corresponding to the turning inward moment=0" can be used as the above-mentioned "predetermined upper limit value".

As described above, in the case where braking force is also allocated to the second braking force allocated wheel, in Step 535, the target braking force of the first braking force allocated wheel is corrected based on the above-mentioned "predetermined upper limit value", and the target braking force of the second braking force allocated wheel is corrected based on the above-mentioned "amount exceeding the upper limit value". Note that, the target braking force of the wheels other than the first and second braking force allocated wheels is not corrected.

When the correction of the target braking force of each wheel is completed, the vehicle stability control is performed based on the corrected target braking force of each wheel. As a result, in the brake device 10, in the case where there is a reduced braking force wheel among the wheels to be controlled, the wheel cylinder hydraulic pressure (pressing force of the brake pad) of the first braking force allocated wheel (and the second braking force allocated wheel) other than the reduced braking force wheel is increased without correcting the wheel cylinder hydraulic pressure (pressing force of the brake pad) of the reduced braking force wheel itself.

Accordingly, even in the case where the "degree of decrease in braking force" in the reduced braking force wheel is large, a required turning moment is generated reliably due to the increase in braking force of the first braking force allocated wheel (and the second braking force allocated wheel), with the result that the vehicle stability control can be achieved.

The present invention is not limited to the above-mentioned embodiment, and various modified examples can be adopted within the scope of the present invention. For example, in the above-mentioned embodiment, as illustrated in FIG. 5, the "control of compensating for the lack of a braking force" is performed only during the vehicle stability control (see Step 505). In contrast, the "control of compensating for the lack of a braking force" may be performed irrespective of whether the vehicle stability control is being performed or not. In this case, it is determined whether or not there is a reduced braking force wheel among the entire wheels. In the case where the reduced braking force wheel is present, the lacking braking force is applied to the wheels other than the reduced braking force wheel (see Step 525).

Further, in the above-mentioned embodiment, although the mode in which a pressing force of the brake pad is generated through use of the wheel cylinder hydraulic pressure is adopted, a mode in which the pressing force of the brake pad is generated through use of a drive force of an electric motor may be adopted, for example.

The invention claimed is:

1. A vehicle braking force control apparatus, comprising:
determination means for determining whether or not there is a reduced braking force wheel in which a generated braking force is decreased with respect to a braking force corresponding to a pressing force of a friction braking member; and
braking force compensation means for increasing, based on the determination that the reduced braking force wheel is present, the pressing force of the friction braking member of a wheel other than the reduced braking force wheel based on a lack of the braking force in the reduced braking force wheel,
wherein the determination means determines, for each wheel of the vehicle, whether or not the wheel is a reduced braking force wheel by comparing a first braking force of the wheel with a second braking force of the wheel,
wherein the first braking force is estimated based on a wheel cylinder hydraulic pressure of the wheel,
wherein the second braking force is estimated based on slip ratio of the wheel.

2. A vehicle braking force control apparatus according to claim 1,
wherein the vehicle stability control comprises oversteer suppression control of suppressing oversteer of the vehicle, and
wherein a front wheel on an outer side of turning and a rear wheel on the outer side of turning are set in descending order of the priority.

3. A vehicle braking force control apparatus according to claim 1,
wherein the vehicle stability control comprises understeer suppression control of suppressing understeer of the vehicle, and
wherein a rear wheel on an inner side of turning, a front wheel on the inner side of turning, a rear wheel on an outer side of turning, and a front wheel on the outer side of turning are set in descending order of the priority.

4. A vehicle braking force control apparatus, comprising:
control means for performing vehicle stability control of generating a braking force by adjusting a pressing force of a friction braking member for each wheel in order to enhance travel stability of a vehicle without depending on a braking operation of a driver;
determination means for determining whether or not there is a reduced braking force wheel in which a braking force is generated due to the vehicle stability control and the generated braking force is decreased with respect to a braking force corresponding to the pressing force of the friction braking member during the vehicle stability control; and
braking force compensation means for identifying, based on the determination that the reduced braking force wheel is present, among a plurality of wheels excluding the reduced braking force wheel, a first braking force allocated wheel with a highest order of priority determined in advance for wheels for which a braking force needs to be generated in order to enhance the travel stability in the vehicle stability control, and for increasing the pressing force of the friction braking member of the first braking force allocated wheel based on a lack of the braking force in the reduced braking force wheel,
wherein the determination means determines, for each wheel of the vehicle, whether or not the wheel is a reduced braking force wheel by comparing a first braking force of the wheel with a second braking force of the wheel,
wherein the first braking force is estimated based on a wheel cylinder hydraulic pressure of each the wheel,
wherein the second braking force is estimated based on slip ratio of the wheel.

5. A vehicle braking force control apparatus according to claim 4, wherein, in a case where the pressing force of the friction braking member of the first braking force allocated wheel exceeds a predetermined upper limit value due to an increase in the pressing force, the braking force compensation means is configured to adjust the pressing force of the friction braking member of the first braking force allocated wheel to a value equal to the predetermined upper limit value, and increase the pressing force of the friction braking member of a second braking force allocated wheel based on an amount exceeding the predetermined upper limit value, the second braking force allocated wheel having a second highest order of priority among the plurality of wheels excluding the reduced braking force wheel.

6. A vehicle braking force control apparatus according to claim 5, wherein the predetermined upper limit value is set based on a slip ratio of the first braking force allocated wheel.

* * * * *